Nov. 15, 1938.  H. M. ULLSTRAND  2,136,600
REFRIGERATION
Filed July 11, 1935

INVENTOR.
Hugo M. Ullstrand
BY
Wm. S. Hedlund
his ATTORNEY.

Patented Nov. 15, 1938

2,136,600

UNITED STATES PATENT OFFICE 2,136,600

REFRIGERATION

Hugo M. Ullstrand, Evansville, Ind., assignor, by mesne assignments, to Servel, Inc., Dover, Del., a corporation of Delaware Application July 11, 1935, Serial No. 30,795

17 Claims. (Cl. 62—119.5)

My invention relates to refrigerating apparatus and more particularly to refrigerating apparatus of the kind wherein an inert gas or pressure equalizing agent is circulated between a vessel known as an evaporator, which is in heat exchange relation with the objective of refrigeration, and a vessel known as an absorber, in which a refrigerant fluid passes into solution. Still more particularly my invention relates to apparatus of the foregoing kind in which the pressure equalizing agent or inert gas is circulated by means of differences of specific gravity of vertically extending bodies of fluid.

The efficiency of an apparatus of the kind specifically identified would be improved if the circulation of the inert gas were automatically reduced a greater extent at low capacity or load. The purpose of the present invention is to provide a simple and effective means for better correlating the circulation to different capacities. To carry this out I utilize excess refrigerant flowing in liquid form from the bottom of the evaporator. I utilize this liquid to form a seal for closing a by-pass connection between the paths of flow of gas to and from the evaporator. When no refrigerant liquid leaves the evaporator, the rate of gas circulation should be reduced. This takes place automatically due to the fact that the liquid no longer forms a seal and the by-pass or vent thus provided acts as a brake on the circulation.

Figure 1:
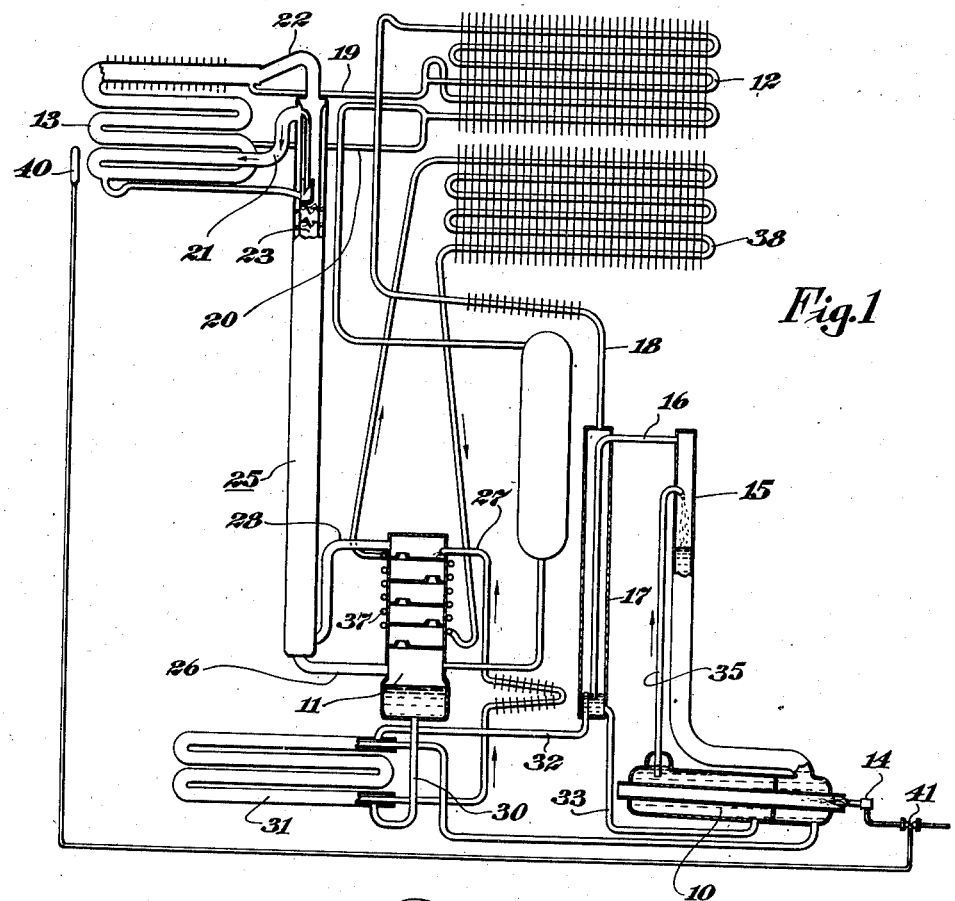
Figure 2:
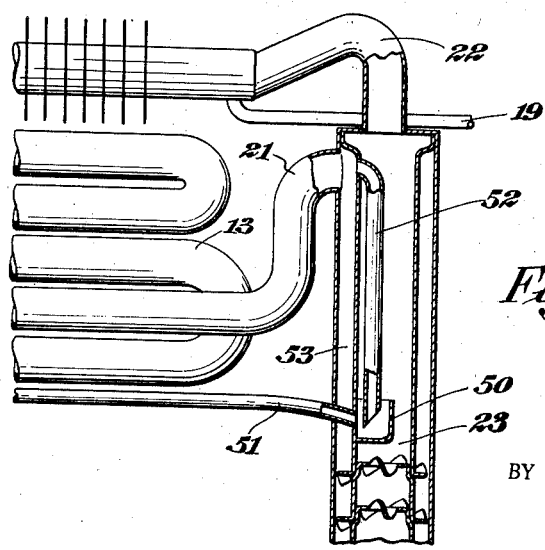

The invention will be described more fully by reference to the accompanying drawing showing one embodiment of my invention, and of which:

Fig. 1 is a diagrammatic view of a system or apparatus embodying the invention; and Fig. 2 is a showing on enlarged scale of a part of the apparatus shown in Fig. 1, for the purpose of more clearly showing the invention.

The system includes the usual generator 10, absorber 11, condenser 12, and evaporator 13. These parts are interconnected by conduits as will be briefly described, although the system in general is known in the art. The system contains a solution of ammonia in water or other refrigerant in absorption liquid and also contains an inert gas such as hydrogen. Heat is applied to the generator as by a gas burner 14, and ammonia vapor is driven off from solution in the generator. This vapor passes upwardly through the tube 15 and through the pipe 16 through an analyzer 17 and thence through pipe 18 to the condenser 12 where the liquid is condensed and flows through conduits 19 and 20 into the evaporator 13.

In the evaporator, liquid ammonia meets a stream of inert gas entering through conduit 21. The liquid refrigerant flows downwardly through the evaporator while the gas flows upwardly therethrough. In the evaporator, a rich mixture of ammonia vapor and hydrogen is formed, which flows out of the evaporator through connection 22 and the inner pipe 23 of a heat exchanger. The heat exchanger may be constructed generally as shown in U. S. Patent No. 1,880,533 dated Oct. 4, 1932. From the gas heat exchanger (generally designated by numeral 25), the gas flows through connection 26 to the absorber 11. Here the gas mixture meets a downwardly flowing shower of water or weak liquor which enters the absorber through pipe 27. The water absorbs the ammonia from the hydrogen leaving free or weak hydrogen to flow through connection 28 into the outer path of the gas heat exchanger 25 and thence back to the evaporator. Circulation is produced between the evaporator and absorber due to the fact that the strong gas mixture in the inner path 23 of the gas heat exchanger is heavier than the weak gas flowing through the outer path of the gas heat exchanger, this because ammonia in gaseous form is appreciably heavier than hydrogen.

From the bottom of the absorber, the strong liquor therein formed passes through the connection 30 and through a liquid heat exchanger 31 and a conduit 32 into analyzer 17 and thence through connection 33 to the generator. The liquid is lifted in the generator by means of thermosyphon tube 35 and flows back into the generator through the pipe 15. Vapor leaving thermosyphon tube 35, together with the vapor passing upwardly through conduit 15, passes through the conduits 16 and 18 to the condenser as previously described.

The absorber may be cooled directly by air or may be cooled as shown by a coil 37 in contact with the same connected to a condensing section 38. This is what is known as secondary cooling.

The refrigerating system may be controlled by a thermostat bulb 40 near the evaporator controlling a valve 41 supplying gas to the burner 14. If the evaporator temperature increases due to a greater load on the apparatus, the thermostat 40 responds by increasing the supply of fuel. This increases the amount of ammonia driven out of solution in the generator, and also increases the amount of ammonia condensed, and thereby increases the amount of liquid ammonia flowing to the evaporator. The amount of liquid ammonia evaporated bears a relation to the amount of refrigeration produced. Thus, the evaporative effect is correlated to the load, but the circulation of inert gas is not responsive to the same extent to load, and it is this feature which forms the basis of my invention. The circulation of inert gas should not be greater than necessary to care for the amount of refrigerant evaporation required by the load. If the circulation of inert gas is adjusted by means of original construction of the apparatus to suit a certain load or rate of evaporation, the same rate of gas circulation at a lesser rate of evaporation results in an unnecessary loss. There naturally occurs a reduction in the rate of gas circulation upon decrease in load because of the reduction in the rate of evaporation, but this is not as much as desired at low loads and I propose to better this situation by automatically restricting the gas circulation when the evaporator is operating at low capacity. Referring to Fig. 2, I show one way of carrying out the invention. I place a cup 50 in the space 23 of the gas heat exchanger, which cup opens into the space 23, and to which is connected the usual liquid drain line 51 from the lower part of the evaporator. Thus, excess unevaporated refrigerant flows through conduit 51 into the cup 50. I also provide a by-pass or vent conduit 52 which is connected to the outer space 53 of the gas heat exchanger opposite the connection 21. This conduit or vent 52 also extends within cup 50 and opens therein so that it may be sealed by an appreciable amount of liquid in the cup 50.

At high capacity, excess liquid ammonia runs through the evaporator. When this happens, the excess liquid ammonia flows through conduit 51 into the cup 50 and seals the by-pass connection 52. Under these conditions, the circulating system is fully effective. On the other hand, when no liquid ammonia leaves the evaporator the gas circulation should be restricted to correspond to the lesser rate of evaporation. This happens when the thermostat has reduced the flame. Under these circumstances any liquid ammonia in cup 50 evaporates into the gas in space 23 and the by-pass connection 52 is opened. This provides a "short circuit" in the gas circulation circuit inasmuch as some of the inert gas can pass through connection 22 into the space 23 of the gas heat exchanger and back through the by-pass 52 into connection 21 and thence to the evaporator without passing through the absorber.

It will be obvious that various modifications may be made. The same result may be obtained by the use of moving parts, as by using a float in the cup 50 which controls an opening in the wall between the spaces 23 and 53 of the gas heat exchanger. Consequently it will be understood that the invention is not limited to the structure hereinbefore specifically described.

What I claim is:

1. In a refrigerating system, an evaporator, an absorber, conduits connecting the evaporator and absorber for circulation of gaseous fluid, a by-pass communication between said conduits, and means to open and close said by-pass with respect to flow of gas therethrough.

2. In a refrigerating system, an evaporator, an absorber, a heat exchanger, conduits connecting the evaporator, absorber and heat exchanger for flow of fluid through different spaces of the heat exchanger, a by-pass connection between the spaces of the heat exchanger for flow of gaseous fluid, and means to open and close said by-pass with respect to flow of gas therethrough.

3. In a refrigerating system, an evaporator, an absorber, conduits connecting the evaporator and absorber for circulation of gaseous fluid, a by-pass connection between said conduits, and means to receive excess liquid refrigerant from the evaporator to close the by-pass connection, said means exposing liquid therein directly to flowing gaseous fluid so said means is emptied of liquid by evaporation to open said by-pass when excess liquid is not received.

4. In a refrigerating system, an evaporator, an absorber, members forming a circulatory path of flow for gas between the evaporator and the absorber, and means to short-circuit a portion of said path of flow only upon decrease in amount of refrigerant evaporated in the evaporator.

5. In a refrigerating system, an evaporator, an absorber, conduits connecting the evaporator and absorber for circulation of an inert gas, and means to automatically restrict the rate of circulation of inert gas when the evaporator is operating at less than average capacity.

6. In a refrigerating system, an evaporator, an absorber, conduits connecting the evaporator and absorber for circulation of gaseous fluid, a tube forming a by-pass connection between said conduits, a cup into which said tube opens, and an overflow connection between the evaporator and said cup.

7. In a refrigerating system, an evaporator, an absorber, conduits connecting the evaporator and absorber for circulation of gaseous fluid, a by-pass communication between said conduits, and means for controlling said by-pass communication responsive to an operating condition of the system.

8. A refrigerating system including an evaporator, an absorber, members for circulation of inert gas through and between said evaporator and absorber, a conduit for conducting liquid refrigerant to said evaporator, a chamber for holding liquid in contact with circulating inert gas, a conduit for conducting unevaporated liquid refrigerant from said evaporator to said chamber, and means for changing the rate of gas circulation operated by rise and fall of the level of liquid in said chamber responsive to the differential between flow of liquid into said chamber and evaporation of liquid in the chamber.

9. A refrigerating system including an evaporator, an absorber, members including a gas heat exchanger for circulation of inert gas through and between said evaporator and absorber, a conduit for conducting liquid refrigerant to said evaporator, a chamber in said gas heat exchanger for holding liquid in contact with circulating inert gas, a conduit for conducting unevaporated liquid refrigerant from said evaporator to said chamber, and means for changing the rate of gas circulation operated by rise and fall of the level of liquid in said chamber responsive to the differential between flow of liquid into said chamber and evaporation of liquid in the chamber.

10. A refrigerating system including an evaporator, an absorber, members including a gas heat exchanger for circulation of inert gas through and between said evaporator and absorber, a conduit for conducting liquid refrigerant to said evaporator, a chamber for holding liquid in contact with circulating inert gas flowing toward said absorber, a conduit for conducting unevaporated liquid refrigerant from said evaporator to said chamber, and means for changing the rate of gas circulation operated by rise and fall of the level of liquid in said chamber responsive to the differential between flow of liquid into said chamber and evaporation of liquid in the chamber.

11. In a refrigerating system including an evaporator and an absorber interconnected to form a circuit for inert gas, means to receive liquid refrigerant and hold the liquid refrigerant in contact with circulating inert gas, and means for changing the rate of gas circulation responsive to the differential between rate of flow of liquid refrigerant into said receiving means and evaporation of liquid therefrom.

12. In a refrigerating system, a circuit for inert gas including an evaporator and an absorber, means for receiving liquid refrigerant and holding the liquid refrigerant in contact with circulating inert gas, a short-circuiting passage for inert gas intermediate said evaporator and absorber, and means for controlling said by-pass responsive to level of liquid in said receiving means.

13. In a refrigerating system containing refrigerant fluid, absorption liquid, and inert gas, a circuit for the inert gas including an evaporator and an absorber, means for receiving liquid refrigerant and holding the liquid refrigerant in pure liquid phase in contact with circulating inert gas, and means for changing the rate of inert gas circulation responsive to level of liquid in said receiving chamber.

14. In a refrigerating system making use of evaporation and diffusion of refrigerant fluid into an inert gas and absorption of refrigerant fluid out of the inert gas into an absorption liquid, that improvement which consists in accumulating refrigerant fluid in pure liquid phase out of circulation responsive to an operating condition of the system and increasing rate of flow of said inert gas by said accumulated liquid.

15. In a refrigerating system making use of evaporation and diffusion of refrigerant fluid into an inert gas and absorption of refrigerant fluid out of the inert gas into an absorption liquid, that improvement which consists in accumulating refrigerant fluid in pure liquid phase out of circulation upon increase in load and increasing rate of flow of said inert gas by said accumulated liquid.

16. In a refrigerating system of the kind utilizing a refrigerant and flowing inert gas into which the refrigerant diffuses, the improvement which consists in utilizing unevaporated refrigerant in contact with said flowing gas to control the rate of gas flow with respect to the refrigerant.

17. In a refrigerating system of the kind utilizing a refrigerant and flowing inert gas into which the refrigerant diffuses, the improvement which consists in accumulating excess unevaporated refrigerant in contact with said flowing gas and utilizing such accumulation of refrigerant to control the rate of gas flow with respect to the refrigerant.

HUGO M. ULLSTRAND.